United States Patent
Hulin et al.

(10) Patent No.: US 11,675,145 B2
(45) Date of Patent: Jun. 13, 2023

(54) INJECTION OF A BEAM OF RADIATION INTO AN OPTICAL FIBRE

(71) Applicant: AIRBUS DEFENCE AND SPACE SAS, Toulouse (FR)

(72) Inventors: Jérémy Hulin, Toulouse (FR); Paul Berceau, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 123 days.

(21) Appl. No.: 17/429,282

(22) PCT Filed: Jan. 14, 2020

(86) PCT No.: PCT/FR2020/050045
§ 371 (c)(1),
(2) Date: Aug. 6, 2021

(87) PCT Pub. No.: WO2020/161405
PCT Pub. Date: Aug. 13, 2020

(65) Prior Publication Data
US 2022/0137309 A1 May 5, 2022

(30) Foreign Application Priority Data
Feb. 8, 2019 (FR) ...................................... 19 01267

(51) Int. Cl.
*G02B 6/42* (2006.01)
*H04B 10/118* (2013.01)

(52) U.S. Cl.
CPC ......... *G02B 6/4214* (2013.01); *G02B 6/4222* (2013.01); *H04B 10/118* (2013.01)

(58) Field of Classification Search
CPC .. G02B 6/4214; G02B 6/4222; G02B 6/4246; G02B 6/4227; G02B 6/4234; H04B 10/118
See application file for complete search history.

(56) References Cited

U.S. PATENT DOCUMENTS

2006/0209297 A1 9/2006 Biet et al.
2010/0158536 A1 6/2010 Vaillon et al.

FOREIGN PATENT DOCUMENTS

| EP | 2 173 042 | 4/2010 |
| FR | 2 535 857 | 5/1984 |
| JP | 2007-79387 | 3/2007 |

OTHER PUBLICATIONS

Notification of Reasons for Refusal for Japanese Application Number Tokugan 2021-545852, eight pages, dated Feb. 1, 2022.
(Continued)

*Primary Examiner* — Xinning(Tom) Niu
(74) *Attorney, Agent, or Firm* — Nixon & Vanderhye P.C.

(57) ABSTRACT

A system for injection of a useful radiation beam into an optical fiber is disclosed including a secondary radiation source, which is connected to the optical fiber such that a secondary radiation beam leaves by an end of the optical fiber. A variable deviation device, for deviating the useful radiation beam towards the end of the optical fiber, an optical detection assembly, identifying the direction of the secondary radiation beam, and an injection controller, for controlling the variable deviation device depending on the direction of the secondary radiation beam. The secondary radiation may be made up by an amplified spontaneous emission from a laser amplifier which is used for amplifying the useful radiation. The injection system may advantageously be used in a terminal for optical telecommunication by laser signals.

14 Claims, 3 Drawing Sheets

(56) References Cited

OTHER PUBLICATIONS

French International Search Report for PCT/FR2020/050045 dated May 13, 2020, 3 pages.
English Translation of French International Search Report for PCT/FR2020/050045 dated May 13, 2020, 2 pages.
French Written Opinion of the ISA for PCT/FR2020/050045 dated May 13, 2020, 8 pages.
French Search Report and Written Opinion of French Application No. 1901267 dated Nov. 7, 2019, 9 pages.

[FIG. 1]

INJECTION OF A BEAM OF RADIATION INTO AN OPTICAL FIBRE

CROSS REFERENCE TO RELATED APPLICATIONS

The present application is a National Phase of International Application Number PCT/FR2020/050045 filed Jan. 14, 2020, which designated the U.S. and claims priority benefits from French Application Number FR 1901267 filed Feb. 8, 2019, the entire contents of each of which are hereby incorporated by reference.

FIELD OF THE INVENTION

The invention relates to a system for injection of a radiation beam, in particular a laser beam, into an optical fiber, and also its use in a terminal for optical telecommunication by laser signals.

BACKGROUND ART

Many optical applications require injecting an electromagnetic radiation beam into an optical fiber by one end thereof. That requires focusing the beam on the end of the optical fiber, while eliminating or at least reducing a transverse offset which could exist between the focal point of the beam and the end of the optical fiber.

Such alignment requirement becomes even more severe as the diameter of the optical fiber becomes smaller compared to the diameter of the radiation beam propagating in free space, which is the case when the optical fiber is single-mode type.

To perform such an alignment, it was already proposed to view the impact of the focused beam in the plane of the end of the optical fiber using a camera and to use a device for displacement of the end of the optical fiber relative to the focal point of the beam. However, as long as the focal point of the beam is outside the end of the optical fiber, this end is not illuminated, and therefore not visible in the images provided by the camera. It is then necessary to add an external light source for lighting the end of the fiber, in order to make it visible at the same time as the radiation beam in the images captured. But such an additional light source leads to increased dimensions and cost, even though it doesn't directly participate in the function of the device which uses the radiation beam and optical fiber.

Finally, there are circumstances in which some phenomena could change an alignment between the radiation beam and the end of the optical fiber which has already been adjusted. A typical cause of partial or complete loss of this alignment is for example thermal variations of the entirety of the system. Indeed, such thermal variations can cause dimensional variations of the mechanical connection between the end of the optical fiber and the optics which provide the focused radiation beam. Other causes can be mechanical perturbations, especially vibrations.

In a terminal for optical telecommunication by laser signals, a beam of the received laser signals is injected into an optical fiber in order to be guided to a high-speed photodetector. But the direction of the beam of the received laser signals, such as it appears in the focal plane of the terminal through the location where this beam is focused, varies depending on the forward-pointing angle which is adjusted for a communication sequence. Indeed, the forward-pointing angle depends on the relative displacement and the separation from an external telecommunication terminal which emitted the received laser signals, for the communication session in progress. This external terminal may vary between two successive communication sessions so that the forward-pointing angle is no longer the same. The forward-pointing angle may also vary with the relative movement of the two terminals during a single communication session. It is therefore necessary to continually adjust the alignment between the focal point of the beam of the received laser signals and the end of the optical fiber. But, when the optical telecommunication terminal is loaded on board a satellite, the system which provides the alignment of the beam of the received laser signals relative to the end of the optical fiber must have low energy consumption in addition to being light and low-volume.

TECHNICAL PROBLEM

Based on this situation, an object of the present invention is to propose a new system for adjustment of the position of the focal point of a radiation beam on one optical fiber end, which meets at least some of the requirements of weight, dimensions, energy consumption and cost to a greater extent.

An additional object of the invention is to provide such adjustment system which may be used within a terminal for optical telecommunication by laser signals.

BRIEF SUMMARY OF THE INVENTION

To meet a least one of these objects or another, a first aspect of the invention proposes a system for injection of a useful electromagnetic radiation beam into an optical fiber, which comprises the following elements:

the optical fiber, with one end of this optical fiber onto which at least a first part of the useful radiation beam is intended to be directed, so as to inject this first part of the useful radiation beam into the optical fiber by the end thereof;

an optical entry, by which the useful radiation beam is intended to enter the injection system;

a first optical path, which is intended to connect the optical entry to the end of the optical fiber, towards this end of the optical fiber;

an optical detection assembly, which is suited for identifying a direction of a radiation beam received by this optical detection assembly;

a second optical path, which connects the end of the optical fiber to the optical detection assembly, towards this optical detection assembly;

a secondary radiation source, which is connected to the optical fiber so that a secondary radiation beam exits through the end of the optical fiber into the second optical path, and that the optical detection assembly produces at least one first detection signal identifying a direction of origin of the secondary radiation beam;

a variable deviation device, which is arranged on the first optical path in order to deviate the first part of the useful radiation beam; and an injection controller, which is suited for controlling the variable deviation device depending on the at least one first detection signal, so that the first part of the useful radiation beam deviated by the variable deviation device is incident onto the end of the optical fiber.

Since the secondary radiation, which is used in the system of the invention to identify the position of the end of the optical fiber with the help of the optical detection assembly, originates from this fiber by exiting through the end thereof, this secondary radiation does not light a major portion of the focal plane in which the end of the optical fiber is located. The source of this secondary radiation may then be low-power, and therefore low-volume, with low energy consumption and reduced weight.

In particularly advantageous implementations of the invention, the system may further comprise a laser amplifier which is associated with the optical fiber, so that the first part of the useful radiation beam which enters the optical fiber by the end thereof is transmitted to the laser amplifier. The laser amplifier may in that way amplify the first part of the useful radiation beam which enters the optical fiber by the end thereof. Preferably, the laser amplifier itself may be made in the form of an optical fiber, in order to reduce the cost, dimensions and weight of the whole system.

Then, the laser amplifier may be further adapted for producing amplified spontaneous emission radiation and transmitting this amplified spontaneous emission radiation in the optical fiber all the way to the end thereof. Thus, at least a part of the amplified spontaneous emission radiation constitutes the secondary radiation, and the laser amplifier constitutes the secondary radiation source. The laser amplifier thus has the double function of amplifying the useful radiation which is received by the injection system, and a producing the secondary radiation which is useful for aligning the first part of the useful radiation beam relative to the end of the optical fiber. In this way, the secondary radiation source is no longer an additional component which is specifically dedicated to the alignment function. Additional improvements in weight, dimensions and costs are thus achieved.

Generally for the invention, the optical fiber may be single-mode type. Obviously, the invention may also be implemented with multimode optical fiber, although the injection of the radiation beam into the fiber is then easier.

Again generally for the invention, the variable deviation device may comprise a mirror orientable along one axis or two axes of rotation, which is arranged for simultaneously reflecting the first part of the useful radiation beam towards the end of the optical fiber and the secondary radiation beam towards the optical detection assembly.

Again generally for the invention, the optical detection assembly may comprise a combination of an imager and a matrix image sensor, arranged for focusing the secondary radiation beam or at least a part thereof, onto the matrix image sensor.

In preferred embodiments of the invention, the injection system may further comprise:
  an optical path coupling device, which is arranged so that the first and second optical paths are superposed between this coupling device and the end of the optical fiber, wherein the coupling device is suited for transmitting the first part of the useful radiation beam towards the end of the optical fiber, and for simultaneously transmitting the secondary radiation beam towards the optical detection assembly. For such configurations of the injection system, the variable deviation device is arranged in the first and second optical paths between the coupling device and the end of the optical fiber, so that it simultaneously deviates the first part of the useful radiation beam which propagates towards the end of the optical fiber and the secondary radiation beam which propagates towards the optical detection assembly. The instantaneous deviations of beams that it produces, which are effective for the first part of the useful radiation beam and for the secondary radiation beam, respectively, are correlated.

For these preferred embodiments of the invention, the coupling device may further be suited for directing a second part of the useful radiation beam towards the optical detection assembly. Thus, the optical detection assembly may further produce at least one second detection signal which identifies a direction of the first part of the useful radiation beam. In other words, the optical detection assembly may serve to determine both the direction of the useful radiation beam and the position of the end of the optical fiber onto which the useful radiation beam is to be directed. Then, the injection controller may be adapted for controlling the variable deviation device so as to make the first part of the useful radiation beam and the secondary radiation beam parallel between the coupling device and the variable deviation device. When they are parallel, the first part of the useful radiation beam is incident onto the end of the optical fiber.

Again for the preferred embodiments of the invention, the coupling device may comprise a radiation splitter, for example a biprism splitter and a reflector assembly. The radiation splitter may then be arranged for transmitting the first part of the useful radiation beam towards the variable deviation device, and for simultaneously transmitting the secondary radiation beam towards the reflector assembly, and again for simultaneously transmitting, towards the optical detection assembly, at least one part of the secondary radiation beam after it has been reflected by the reflector assembly. For such configurations of the coupling device, the reflector assembly may comprise several rigidly connected flat reflectors. In particular, it may comprise three flat mirrors which are arranged to form a trihedron of which one internal opening contains a corner of a cube which has a shared vertex with the trihedron. Such a configuration of the reflector assembly serves to control the alignment of the first part of the useful radiation beam relative to the end of the optical fiber, without any risk of mixing up the detection signals which are produced simultaneously by the optical detection assembly but which relate separately to the useful radiation beam and to the secondary radiation beam. In particular, such mix-up is avoided even when the first part of the useful radiation beam and the secondary radiation beam are superposed between the radiation splitter and the variable deviation device.

Furthermore, a second aspect of the invention proposes a terminal for optical telecommunication by laser signals, which comprises:
  a receiving optical path, arranged for receiving first laser signals from a source external to the terminal;
  an optical emission path, arranged for transmitting second laser signals to this external source;
  a tracking optical detection assembly, arranged for receiving a portion of the first laser signals; and
  at least one tracking controller, suited for adjusting an emission direction or a pointing direction of the terminal depending on a reception direction of the first laser signals identified by the tracking optical detection assembly.

According to the invention, the terminal comprises an injection system which meets the first aspect of the invention, wherein the first laser signals form the useful radiation beam, wherein the first optical path and the optical fiber are parts of the receiving optical path, and wherein the optical fiber is arranged for transmitting at least a portion of the first laser signals to a receiving photodetector.

Advantageously, the injection system of the optical telecommunication terminal may be of one of the preferred embodiments cited above, wherein the optical detection assembly serves to identify both the direction of the useful radiation beam and the position of the end of the optical fiber. Within the optical telecommunication terminal, the tracking optical detection assembly may then constitute the optical detection assembly of the injection system, part of the first laser signals intended for the tracking function further forming the second part of the useful radiation beam used by the injection system.

The tracking optical detection assembly may comprise a matrix image sensor which has a photosensitive surface, with a part of this photosensitive surface, called useful zone for the tracking function, which is conjugated with an optical entry field of the terminal, so that any point of this useful zone for the tracking function corresponds to a reception direction within the entry optical field of the terminal, and that any point of the photosensitive surface which does not belong to the useful zone for the tracking function does not correspond to any reception direction of the terminal. Then, the coupling device may implement a radiation splitter and several rigidly connected flat reflectors, these latter being arranged so that the secondary radiation beam arrives onto the photosensitive surface of the matrix image sensor outside of its useful zone for the tracking function.

Possibly, the emission optical path may be arranged so that a part of the second laser signals is transmitted towards the tracking optical detection system, so that this tracking optical detection assembly further produces at least one third detection signal which identifies the emission direction of the terminal. In that way, the same optical detection assembly can have the following three functions:
  controlling the emission direction of the optical telecommunication terminal;
  controlling the alignment of the beam of the received laser signals relative to the end of the optical fiber; and
  tracking the received optical signals.
In this case, and again if the coupling device implements a radiation splitter and several rigidly connected flat reflectors, the part of the second laser signals may be transmitted towards the tracking optical detection assembly by the coupling device of the injection system, so as to also arrive onto the photosensitive surface of the matrix image sensor outside of the zone useful for the tracking function, in addition to the second radiation beam. The useful zone for the tracking function of the matrix image sensor may thus be exclusively dedicated to the detection of the reception direction of the first laser signals, while also simultaneously providing, with the same optical detection assembly, the two other functions previously mentioned: the control of the alignment of the received laser signals—meaning the first laser signals—relative to the end of the optical fiber, and the control of the emission direction of the optical telecommunication terminal relative to the optical axis of this terminal.

BRIEF DESCRIPTION OF THE DRAWINGS

The features and advantages of the present invention will appear more clearly in the following detailed description of non-limiting implementation examples, provided with reference to the attached figures among which.

DETAILED DESCRIPTION OF THE INVENTION

For reasons of clarity, the dimensions of the elements which are shown in these figures do not correspond to either real dimensions or to ratios of real dimensions. Further, some of these elements are only shown symbolically, and identical references which are indicated in various figures designate elements which are identical or have identical functions.

Figure 1:
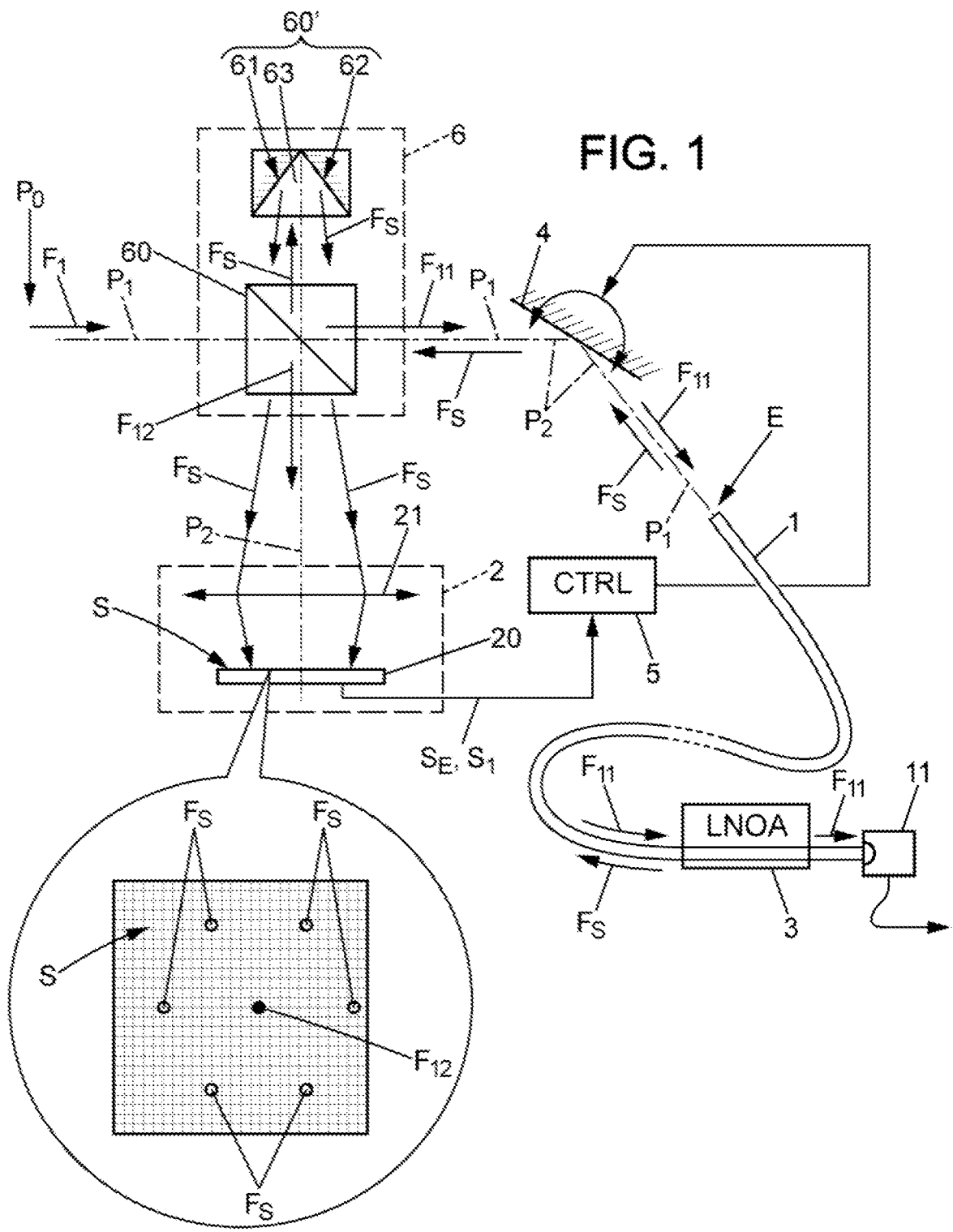
FIG. 1 is an optical drawing of a system for beam injection into an optical fiber, which meets the present invention.

According to FIG. 1, a system for beam injection into an optical fiber comprises an optical entry $P_0$ for admission of an electromagnetic radiation beam $F_1$, and an optical fiber 1 with end E. The function of the system is to ensure that a portion $F_{11}$ of the beam $F_1$ is incident on the end E of the optical fiber 1, so that this beam portion $F_{11}$ is next transmitted by the optical fiber 1, by guided propagation inside thereof, for example to a photodetector 11. The beam $F_1$ was called useful radiation beam in the general part of the present description, and may have any wavelength, for example in one of the usual visible light or infrared ranges, compatible with the spectral range of operation of all the optical components of the system. The useful radiation may be laser radiation or successive pulses of laser radiation. The optical fiber 1 may be single-mode type for the useful radiation. In this case, the end E thereof may have a diameter of order 10 μm for a wavelength of the useful radiation of order 1.5 μm.

To this end, a first optical path, noted $P_1$, connects the optical entry $P_0$ to the end E of the optical fiber 1, while being oriented towards the optical fiber 1. The optical path $P_1$ is intended to be followed by the portion $F_{11}$ of the useful radiation beam $F_1$. For reasons of clarity of the figures, a lens for focusing the beam portion $F_{11}$, in the focal plane of which the end E of the optical fiber 1 is located, has not been shown, since its use is well known to the person skilled in the art.

According to the invention, a second optical path, noted $P_2$, is provided for the radiation intended to identify the position of the end E of the optical fiber 1. The optical path $P_2$ connects the end E of the optical fiber 1 to an optical detection assembly 2, towards the assembly 2.

For the invention, each of the optical paths $P_1$ and $P_2$ can be followed by the relevant radiation beam(s) without the direction of each beam being set by the optical path followed. The object of the invention consists of controlling the direction of each radiation beam inside the optical path $P_1$, $P_2$ where this beam propagates.

Preferably, the optical detection assembly 2 may comprise a matrix image sensor 20, for example CMOS type, and an imager 21, for example a convergent lens. Within the optical detection assembly 2, the photosensitive surface S of the matrix image sensor 20 may be located in a focal plane of the imager 21, so that each radiation beam which is incident onto the imager 21 is focused on one or more point(s) of illumination in the photosensitive surface S of the matrix image sensor 20. The position(s) of these points of illumination then represent(s) the direction of incidence of the beam. Preferably, the photosensitive surface S of the matrix image sensor 20 is located in the image focal plane of the imager 21, and each radiation beam which is incident on the imager 21 is collimated.

The radiation which is intended to identify the position of the end E of the optical fiber 1 has been called secondary radiation in the general part of the present description. The beam of this radiation is noted $F_S$ in the figures.

According to a specifically advantageous embodiment of the invention, the optical fiber 1 transmits the part $F_{11}$ of the useful radiation beam $F_1$ to an optical amplifier 3, and then it transmits to the photodetector 11 the so-amplified useful radiation beam. The amplifier 3, marked LNOA for "low-noise optical amplifier" may be an erbium-doped fiber amplifier type, designated EDFA. In a known way, such an amplifier produces radiation from amplified spontaneous emission, or ASE, part of which is guided within the optical fiber 1 towards the end E thereof. The optical fiber 1 is effective for conducting such radiation of amplified spontaneous emission from the amplifier 3 to the end of the fiber E. After exiting through the end E, this portion of amplified spontaneous emission radiation constitutes the secondary radiation beam $F_S$. It propagates in the optical path $P_2$ towards the optical detection assembly 2, and identifies the position of the end E optical fiber 1, by imaging on the photosensitive surface S of the matrix image sensor 20.

A device 6 is inserted for coupling the optical paths $P_1$ and $P_2$, so that these two optical paths are superposed between this device 6 and the end E of the optical fiber 1. The device 6 may comprise a radiation splitter 60 and a reflector assembly 60'. The radiation splitter 60 may be of intensity-division type, for example a biprism such as known to the person skilled in the art, but other types of radiation splitters can be used equivalently. As shown in FIG. 1, the biprism 60 may be arranged so that the part $F_{11}$ of the useful radiation beam $F_1$ traverses it without deviation and so that it simultaneously transmits the secondary radiation beam $F_S$ towards the optical detection assembly 2, via the reflector assembly 60'. For the configuration of the device 6 which is shown, the secondary radiation beam $F_S$ is first reflected by the biprism 60 towards the reflector assembly 60', then retroreflected thereby, and next traverses the biprism 60 again without being reflected, towards the optical detection assembly 2. In that way, the point on the photosensitive surface S at which the beam portion $F_S$ is detected represents the position of the end E of the optical fiber 1. This detection point of the beam $F_S$ is identified by detection signals SE produced by the matrix image sensor 20. These signals SE were called at least one first detection signal in the general part of the present description.

Optionally but advantageously, the biprism 60 further reflects another part of the useful radiation beam $F_1$, noted $F_{12}$, directly towards the optical detection assembly 2. The beam parts $F_{11}$ and $F_{12}$ were called first part and second part of the useful radiation beam $F_1$, respectively, in the general part of the present description. In that way, the matrix image sensor 20 simultaneously receives the part $F_{12}$ of the beam $F_1$ and the secondary radiation beam $F_S$. The point on the photosensitive surface S at which the beam portion $F_{12}$ is detected represents the direction of the beam portion $F_{11}$ which is intended to be directed onto the end E of the optical fiber 1. This detection point of the beam $F_{12}$ is identified by detection signals $S_1$ produced by the matrix image sensor 20. These signals $S_1$ were called at least one second detection signal in the general part of the present description.

A variable deviation device 4 is further arranged on the optical path $P_1$, for example in a path portion which is shared between the optical paths $P_1$ and $P_2$ but without that being indispensable. This device 4 may be made up of a flat mirror which is mounted on a support with two axes of rotation, so as to reflect the portion $F_{11}$ of the useful radiation beam $F_1$ in a variable direction. In the specific case where the variable orientation mirror 4 simultaneously reflects the portion $F_{11}$ of the beam $F_1$ and the secondary radiation beam $F_S$, as shown by FIG. 1, these have identical propagation directions, but propagate in opposite ways, between the mirror 4 and the end E of the optical fiber 1 in one case, and between the mirror 4 and the coupling device 6 in the other, when the mirror 4 is oriented so that the beam portion $F_{11}$ is incident onto the end E of the optical fiber 1. Then, if the reflector assembly 60' is made up of a flat mirror that is fixed and perpendicular to the optical axis of the optical detection assembly 2, the beam portion $F_{12}$ and the beam $F_S$ both impact the photosensitive surface S of the matrix image sensor 20 at a single detection point. Conversely, a gap between the respective detection points of the beam portion $F_{12}$ and the beam $F_S$ on the photosensitive surface S of the matrix image sensor 20 means that the portion $F_{11}$ of the useful radiation beam $F_1$ does not intercept the end E of the optical fiber 1.

According to the invention, an injection controller 5, noted CTRL serves to subject control of the orientation of the orientable mirror 4 to the detection signals SE. It is designed for controlling the orientation of the mirror 4 so as to reduce a gap between an apparent direction in the mirror 4, in which the end E of the optical fiber 1 is located, such as characterized by the detection signals SE, and a reference direction. The reference direction which is used may be constant when the direction of the beam portion $F_{11}$ is itself constant relative to this reference direction. In the embodiment of the invention which is shown by FIG. 1, the reference direction is that of the beam portion $F_{11}$ such as detected by the matrix image sensor 20 by using the beam portion $F_{12}$. It is then not necessarily constant. In this case, based on detection signals SE and $S_1$, the injection controller 5 controls the orientation of the mirror 4 so as to reduce a gap between the respective directions of the beam $F_S$ and the beam portion $F_{11}$, until producing a superposition of these directions. In this way, it is possible to compensate for transverse offsets of the beam portion $F_{11}$ relative to the end E of the optical fiber 1. Such transverse offsets can be due to temperature variations which affect at least one part of the injection system, and/or due to modifications of the direction of the useful radiation beam $F_1$ near the optical entry $P_0$, and/or due to any other cause.

Figure 2:
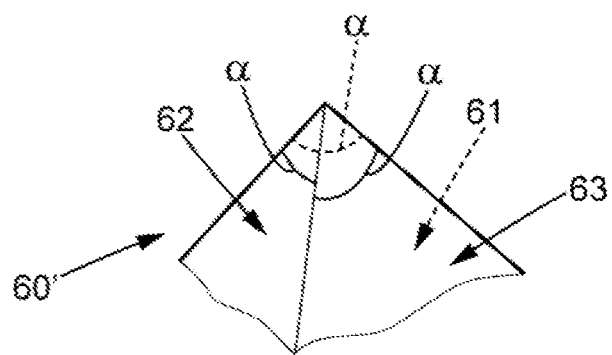
FIG. 2 is a perspective view of a reflector assembly which can be used in the injection system from FIG. 1.

FIG. 2 represents a preferred embodiment for the reflector assembly 60' of the coupling device 6. According to this embodiment, the reflector assembly 60' is formed by three flat mirrors 61, 62 and 63 which are each limited between two straight and concurrent edges which form an angle α between them. The flat mirrors 61, 62 and 63 are combined along their edges, in order to form a symmetric trihedron with angle α at the vertex. The angle α of each mirror 61, 62 and 63, as shown in FIG. 2, is chosen greater than 90°, for example equal to 90.5°. It can be adjusted according to the distances between the optical components used, the sizes thereof, the focal length values thereof, etc. Under these conditions, a radiation beam which is incident on the trihedron of mirrors 61, 62 and 63 is retroreflected in the form of six beams for which the respective directions are distributed symmetrically around a mean reflection direction, where the latter is symmetric for the direction of the incident beam relative to the central axis of the trihedron.

By using such reflector assembly 60' with the trihedron of flat mirrors in the injection system from FIG. 1, the secondary radiation beam $F_S$ is reflected towards the optical detection assembly 2 in the form of six collimated beams symmetrically distributed around an average axis which depends on the direction of incidence of the beam $F_S$ onto the reflector assembly 60'. The insert in FIG. 1 shows the points in the photosensitive surface S of the matrix image sensor 20 which receive secondary radiation during operation of the injection system. Six points are illuminated by the secondary radiation beam $F_S$, these points being located at the vertices of a regular hexagon whose radius depends on the angle α of the trihedral reflector assembly 60'. The direction of the beam $F_S$ such as produced by the orientable mirror 4 corresponds to a barycenter of these six points, which can be determined by the injection controller 5 based on the detection signals SE, these latter indicating the respective positions of the six points in the photosensitive surface S. A calculation to be performed on the detection signals SE by the injection controller 5 for determining the barycenter of the six points representative of the direction of the beam $F_S$ is obvious and accessible to the person skilled in the art.

Since the trihedral reflector assembly 60' is not involved in the characterization of the direction of the portion $F_{11}$ of the useful radiation beam $F_1$, this direction is again characterized by a single detection point in the photosensitive surface S of the matrix image sensor 20. As already indicated, this point is lit by the beam portion $F_{12}$, representative of the direction of the beam portion $F_{11}$.

In that way, because of the trihedral configuration of the reflector assembly 60', with angles at the vertex different from 90°, the detection signals $S_1$ produced by the matrix image sensor 20, which also identify the direction of the useful radiation beam $F_1$ near the optical entry $P_0$, cannot be coincident with the detection signals SE, also produced by the matrix image sensor 20 but which characterize the position of the end E of the optical fiber 1.

Figure 3:
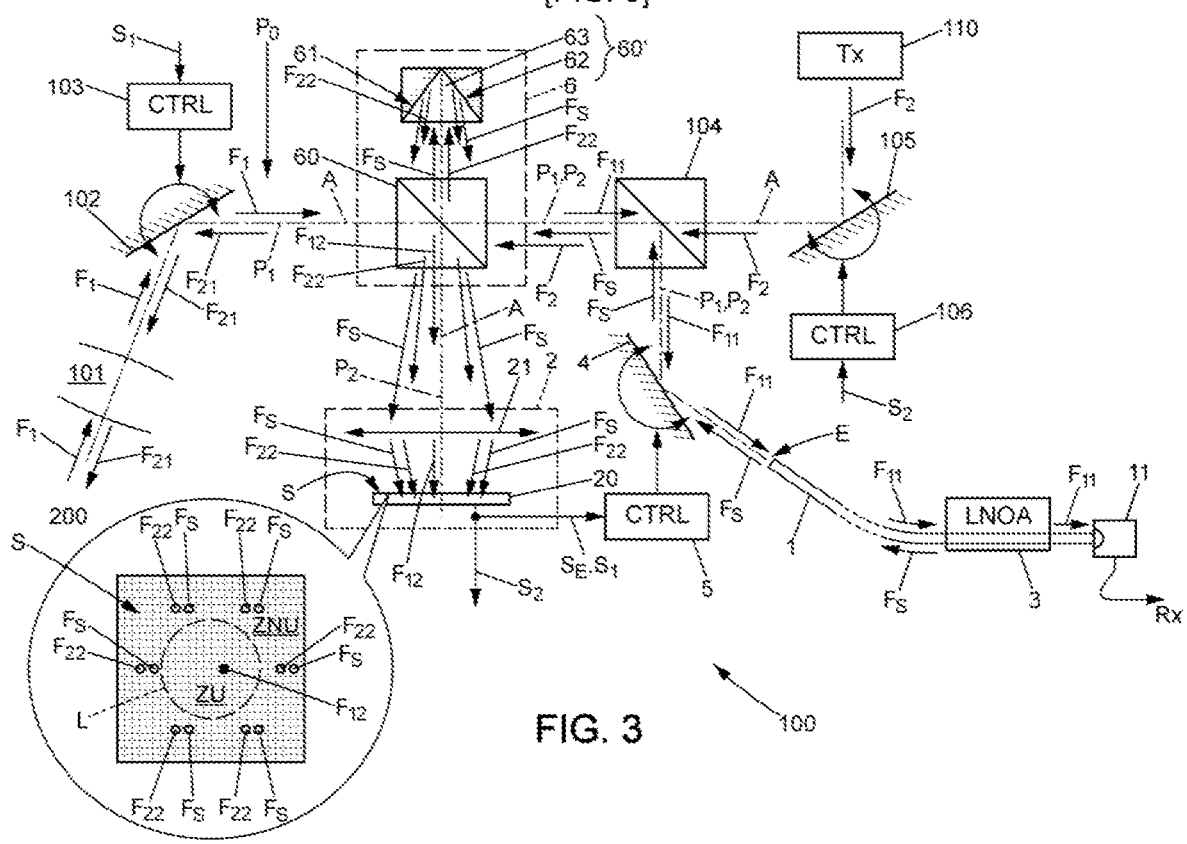
FIG. 3 is an optical drawing of a terminal for optical telecommunication by laser signals, which meets the present invention.

FIG. 3 shows an application of the injection system from FIG. 1 to a terminal 100 for optical telecommunication by laser signals. For this application, the useful radiation beam $F_1$ is formed by laser signals which are received by the terminal 100 from a remote terminal 200. These laser signals received by the terminal 100 were called first laser signals in the general part of the description. They are transmitted within the terminal 100 by an optical receiving path which ends at the photodetector 11, this latter possibly being a high-speed photodiode. The received electrical signals which result therefrom are noted Rx in the figure. The optical path $P_1$ and the optical fiber 1 then constitute two segments of this receiving optical path.

Other laser signals which are transmitted by the terminal 100 to the remote terminal 200 form the portion of the beam $F_{21}$ and were called second laser signals in the general part of the description. They are transmitted within the terminal 100 by an optical emission path which ends at the radiation collecting optics 101.

The terminals 100 and 200 may each be installed on board a different satellite, or else one may be aboard one satellite and the other may be installed on the surface of the Earth or another planet.

The additional references which appear in FIG. 3 have the following meanings:

101: radiation collecting optics for the terminal 100, serving both to collect the beam $F_1$ originating from the remote terminal 200, and for transmitting the beam portion $F_{21}$ towards this remote terminal 200. For example, the collecting optics 101 may be a telescope.

102: pointing device for the terminal 100 which could incorporate a fine pointing device and a course pointing device. For simplicity, the pointing device 102 is shown in the form of a quick reaction orientable mirror, or "fast steering mirror," but it may also be combined with a part of an attitude and orbit control system of a satellite on which the terminal 100 is located.

103: controller for the pointing device 102.

104: coupling device for the emission optical path and the receiving optical path of the terminal 100. This may be a biprism which is arranged between the coupling device 6 and the variable deviation device 4.

105: calibration device for an emission direction of the terminal 100, i.e. the direction of the beam portion $F_{21}$. It is optional and may comprise a variable orientation mirror, which is distinct from the variable deviation device 4 added by the present invention, and also distinct from the pointing device 102.

106: controller for the calibration device 105, for adjusting the emission direction of the terminal 100, i.e. the direction of the beam portion $F_{21}$.

110: source of the laser signals which are transmitted by the terminal 100 to the remote terminal 200.

The optical path which is comprised between the laser signal source 110 and the radiation collecting optics 101 constitutes the optical emission path of the terminal 100.

The operation of each of the components 101 to 110 and their engagement within the terminal 100 are known to the person skilled in the art. In contrast, the combination thereof in the terminal 100 with the injection system of FIG. 1 is an additional aspect of the present invention.

In particular, the pointing device 102 is intended to compensate for vibrations to which the terminal 100 is subject, which would deviate the pointing direction thereof relative to an emission direction sought so that the laser signals which are transmitted by this terminal 100 (i.e. the beam portion $F_{21}$ downstream the collecting optics 101) arrive precisely at the remote terminal 200. To do that, the controller 103 receives detection signals $S_1$, which identify the instantaneous direction of reception of the laser signals originating from the remote terminal 200 (i.e. the beam $F_1$). This function of compensation for the vibrations, with very short response time, is different from that of the variable deviation device 4, for which the reaction time can be longer.

The source 110, noted Tx, produces the beam $F_2$ of laser signals to be transmitted by the terminal 100 to the remote terminal 200. The coupling device 104 is arranged so that the beam $F_2$ of signals to be transmitted by the terminal 100 passes through the biprism 60. The beam $F_2$ is then divided by the biprism 60 into two beam portions: the beam portion $F_{21}$ which is transmitted through the radiation collecting optics 101 towards the remote terminal 200, and another beam portion $F_{22}$ which is directed towards the optical detection assembly 2.

The direction of the beam portion $F_{21}$, upstream the pointing device 102 relative to the propagation direction of the emission laser signals, may be preferred to be coincident with the optical axis of the terminal 100. To do that, the controller 106 subject-controls the calibration system 105 based on the detection signals $S_2$ which are produced by the matrix image sensor 20 from the beam portion $F_{22}$, so that the direction of the beam portion $F_{21}$ is superposed on the optical axis of the terminal 100 upstream the pointing device 102. In the embodiment described, the beam portion $F_{22}$ is directed towards the optical detection assembly 2 by being reflected by the trihedral reflector assembly 60'. The beam portion $F_{22}$ thus lights six other points in the photosensitive surface S of the matrix image sensor 20 (see the points which are referenced $F_{22}$ in the insert of FIG. 3), which are located at the vertices of a regular hexagon whose center corresponds to the direction of the beam $F_2$ upstream the coupling device 6. When the calibration controller 106 subjects the device 105 to automatic control, the detection hexagon of the partial beam $F_{22}$ is centered on the point of intersection of the optical axis of the terminal 100 with the photosensitive surface S. The signals $S_2$ were called at least one third detection signal in the general part of the present description. The calibration controller 106 may determine the direction of the beam portion $F_{22}$ based on the signals $S_2$ representative for the detection hexagon, in a manner similar to what was described for the injection controller 5 with respect to the detection signals SE. Such a calibration function is described in the patent application EP 2009/172, 199, published under number EP 2 173 042 and entitled "Optical transmission-reception unit with control of the transmission direction."

Under the operation conditions of the terminal 100 which were just described, the offset between the respective directions of the beam portion $F_{21}$ and the beam $F_1$ is the forward-pointing angle which is commanded to the terminal 100. This forward-pointing angle is characterized by the detection signals $S_1$ and $S_2$, representing the offset in two dimensions, between the center of the hexagon of the six points in the photosensitive surface S which are lit by the beam portion $F_{22}$, on the one hand, and the point which is lit by the beam portion $F_{12}$ on the other. This angle is produced by orienting the entry optical field of the radiation collecting optics 101 so that the point of impact of the beam portion $F_{12}$ onto the photosensitive surface S of the matrix image sensor 20 is at the location which corresponds to the opposite of the forward-pointing angle sought. For this function, the matrix image sensor 20 is called tracking sensor in the jargon of the person skilled in the art, and the optical detection assembly 2 is called tracking optical detection assembly when it was used according to the invention within the optical telecommunication terminal 100.

The injection system of FIG. 1, such as incorporated into the terminal 100 as shown in FIG. 3, has the effect of compensating for the forward-pointing angle of the terminal 100 for the beam portion $F_{11}$ to be injected in the optical fiber 1. When the injection controller 5 subjects the deviation device 4 to automatic control, the point of the photosensitive surface S of the matrix image sensor 20 which is lit by the beam portion $F_{12}$ appears in the center of the detection hexagon of the secondary radiation beam $F_S$. This centering assures that the laser signals which are transmitted by the radiation collecting optics 101 and by the pointing device 102 reach the photodetector 11 through the optical fiber 1. It simultaneously compensates for deformations internal to the terminal 100, in particular due to thermal variations, which change the position of the end E of the optical fiber 1 relative to some of the optical components of the terminal 100 which are located upstream the optical fiber 1 relative to the direction of propagation of the received laser signals. In that way, the beam portion $F_{11}$ of the laser signals which are received by the terminal 100 is continuously injected into the optical fiber 101 by the end E thereof.

The optical detection assembly 2 therefore participates in the following three functions: control of the pointing device 102, control of the compensation device 105, and control of the deviation device 4, respectively for compensating for vibrations which affect the terminal 100 in its entirety, for controlling the emission direction of the terminal 100, and for controlling the injection of the received laser signals into the optical fiber for guiding towards the receiving photodetector. Such a combination of functions is particularly advantageous for reducing the dimensions, weight and energy consumption of the optical telecommunications terminal 100.

During the operation of the terminal 100, the direction of the beam $F_1$ of the laser signals which are received by the terminal 100, such as detected by the matrix image sensor 20 in the form of a single point of illumination, is contained in a limited area of the photosensitive surface S of the sensor 20. This limited area is conjugated with the whole set of reception directions which are contained in the optical entry field of the radiation collecting optics 101. It is noted ZU and was called useful zone for the tracking function in the general part of the present description. The points of one part of the photosensitive surface S, which is complementary to the zone useful for tracking functions ZU, are not optically conjugated with any reception direction through the collecting optics 101. This portion of the photosensitive surface S which is complementary the zone ZU is noted is ZNU in the insert of FIG. 3. The limit L is the boundary between the zones ZU and ZNU. Then, it is advantageous that the angle $\alpha$ of the trihedron of the reflector assembly 60' be selected such that the six points of the photosensitive surface S, which are lit by the secondary radiation beam $F_S$, and possibly also the six other points, which are lit by the emission beam portion $F_{22}$, be in the ZNU zone. In that way, the detection signals $S_1$ produced by the matrix image sensor 20, which identify the direction of the useful radiation beam $F_1$ of the laser signals received by the terminal 100, cannot be coincident with the detection signals SE, also produced by the matrix image sensor 20 but which characterize the position of the end E of the optical fiber 1. Similarly, the detection signals $S_1$ cannot be coincident with the detection signals $S_2$ produced by the matrix image sensor 20 and which identify the direction of the beam $F_2$ of the laser signals transmitted by the terminal 100.

It is understood that the invention may be reproduced by modifying secondary aspects of the embodiments which were described in detail above, while maintaining at least some of the cited advantages. In particular, optical components which perform functions similar to those of the components described may be used alternatively thereto.

The invention claimed is:

1. A system for injection of a useful electromagnetic radiation beam into an optical fiber, which comprises the following elements:

the optical fiber, with one end of said optical fiber onto which at least a first part of the useful radiation beam is intended to be directed, so as to inject said first part of the useful radiation beam into the optical fiber by said end;

an optical entry, by which the useful radiation beam is intended to enter the injection system;

a first optical path, which is intended to connect the optical entry to the end of the optical fiber, towards said end of the optical fiber;

an optical detection assembly, suited for identifying a direction of a radiation beam received by said optical detection assembly;

a second optical path, which connects the end of the optical fiber to the optical detection assembly, towards said optical detection assembly;

a secondary radiation source, connected to the optical fiber so that a secondary radiation beam exits through the end of the optical fiber in the second optical path, and that the optical detection assembly produces at least one first detection signal which identifies a direction of origin of the secondary radiation beam;

a variable deviation device, arranged on the first optical path in order to deviate the first part of the useful radiation beam; and an injection controller, suited for controlling the variable deviation device depending on the at least one first detection signal, so that the first part of the useful radiation beam deviated by said variable deviation device is incident onto the end of the optical fiber; and, an optical path coupling device, arranged so that the first and second optical paths are superposed between said coupling device and the end of the optical fiber, wherein said coupling device is suited for transmitting the first part of the useful radiation beam towards the end of the optical fiber, and for simultaneously transmitting the secondary radiation beam towards the optical detection assembly;

wherein the variable deviation device is arranged in the first and second optical paths between the coupling device and the end of the optical fiber, so that said variable deviation device simultaneously deviates the first part of the useful radiation beam which propagates towards the end of the optical fiber and the secondary radiation beam which propagates towards the optical detection assembly, according to instantaneous deviations effective for said first part of the useful radiation beam and for said secondary radiation beam, respectively, which are correlated;

wherein the coupling device is further suited for directing a second part of the useful radiation beam towards the optical detection assembly, so that said optical detection assembly further produces at least one second detection signal which identifies a direction of the first part of the useful radiation beam; and, wherein the injection controller is adapted for controlling the variable deviation device so as to make the first part of the useful radiation beam and the secondary radiation beam parallel between the coupling device and the variable deviation device.

2. The injection system according to claim 1, further comprising a laser amplifier, wherein said laser amplifier is associated with the optical fiber, so that the first part of the useful radiation beam which enters said optical fiber by the end of said optical fiber is transmitted to the laser amplifier,
wherein said laser amplifier is further adapted for producing amplified spontaneous emission radiation, and transmitting said amplified spontaneous emission radiation in the optical fiber to the end of said optical fiber, so that at least a part of said amplified spontaneous emission radiation constitutes the secondary radiation, the laser amplifier constituting the secondary radiation source.

3. The injection system according to claim 1, wherein the coupling device comprises a radiation splitter, and a reflector assembly, where the radiation splitter is arranged for transmitting the first part of the useful radiation beam towards the variable deviation device, and for simultaneously transmitting the secondary radiation beam towards the reflector assembly and again for simultaneously transmitting, towards the optical detection assembly, at least one part of the secondary radiation beam after said part of the secondary radiation beam has been reflected by the reflector assembly.

4. The injection system according to claim 3, wherein the reflector assembly comprises several rigidly connected flat reflectors.

5. The injection system according to claim 4, wherein the reflector assembly comprises three flat mirrors which are arranged to form a trihedron of which one internal opening contains a corner of a cube which has a shared vertex with the trihedron.

6. The injection system according to any one of the preceding claim 1, wherein the optical fiber is single-mode type.

7. The injection system according to claim 1, wherein the variable deviation device comprises a mirror orientable along one axis or two axes of rotation, which is arranged for simultaneously reflecting the first part of the useful radiation beam towards the end of the optical fiber and the secondary radiation beam towards the optical detection assembly.

8. A terminal for optical telecommunication by laser signals, comprising:
a receiving optical path, arranged for receiving first laser signals from a source external to said terminal;
an optical emission path, arranged for transmitting second laser signals to said external source;
a tracking optical detection assembly, arranged for receiving a portion of the first laser signals; and
at least one tracking controller, suited for adjusting an emission direction or a pointing direction of the terminal depending on a reception direction of the first laser signals identified by the tracking optical detection assembly, characterized wherein in that the terminal comprises an injection system which meets claim 1,
wherein the first laser signals form the useful radiation beam, wherein the first optical path and the optical fiber are parts of the receiving optical path, and wherein said optical fiber is arranged for transmitting at least a portion of said first laser signals to a receiving photodetector.

9. The terminal according to claim 8, wherein the tracking optical detection assembly constitutes the optical detection assembly of the injection system, and wherein a part of the first laser signals intended for the tracking function further forms said second part of the useful radiation beam used by the injection system.

10. The terminal according to claim 8, wherein the tracking optical detection assembly comprises a matrix image sensor, wherein said matrix image sensor has a photosensitive surface, with a part of the photosensitive surface, called useful zone for the tracking function, which is conjugated with an optical entry field of the terminal, so that any point of the useful zone for the tracking function corresponds to a reception direction within the entry optical field of the terminal, and that any point of the photosensitive surface which does not belong to said useful zone for the tracking function does not correspond to any reception direction of the terminal,
wherein the coupling device of the injection system comprises a radiation splitter, and a reflector assembly, where the radiation splitter is arranged for transmitting the first part of the useful radiation beam towards the variable deviation device, and for simultaneously transmitting the secondary radiation beam towards the reflector assembly and again for simultaneously transmitting, towards the optical detection assembly, at least one part of the secondary radiation beam after said part of the secondary radiation beam has been reflected by the reflector assembly,
the reflector assembly comprising several rigidly connected flat reflectors, and wherein the rigidly connected flat reflectors are arranged so that the secondary radiation beam arrives onto the photosensitive surface of the matrix image sensor outside said useful zone for the tracking function.

11. The terminal according to claim 8, wherein the emission optical path is arranged so that a part of the second laser signals is transmitted towards the tracking optical detection system, so that said tracking optical detection assembly further produces at least one third detection signal which identifies an emission direction of the terminal.

12. The terminal according to claim 11, wherein the coupling device of the injection system comprises a radiation splitter, and a reflector assembly, where the radiation splitter is arranged for transmitting the first part of the useful radiation beam towards the variable deviation device, and for simultaneously transmitting the secondary radiation beam towards the reflector assembly and again for simultaneously transmitting, towards the optical detection assembly, at least one part of the secondary radiation beam after said part of the secondary radiation beam has been reflected by the reflector assembly, the reflector assembly comprising several rigidly connected flat reflectors, and wherein said part of the second laser signals is transmitted towards the tracking optical detection assembly by the coupling device of the injection system, so as to arrive onto the photosensitive surface of the matrix image sensor outside of the zone useful for the tracking function, in addition to the second radiation beam.

13. The injection system according to claim 3, wherein the radiation splitter is a biprism splitter.

14. The terminal according to claim 10, wherein the radiation splitter is a biprism splitter.

\* \* \* \* \*